Nov. 22, 1927.  1,650,253
F. ZAGELMEYER
AUTOMOBILE CAMP TRAILER
Filed Oct. 7, 1922  5 Sheets-Sheet 1
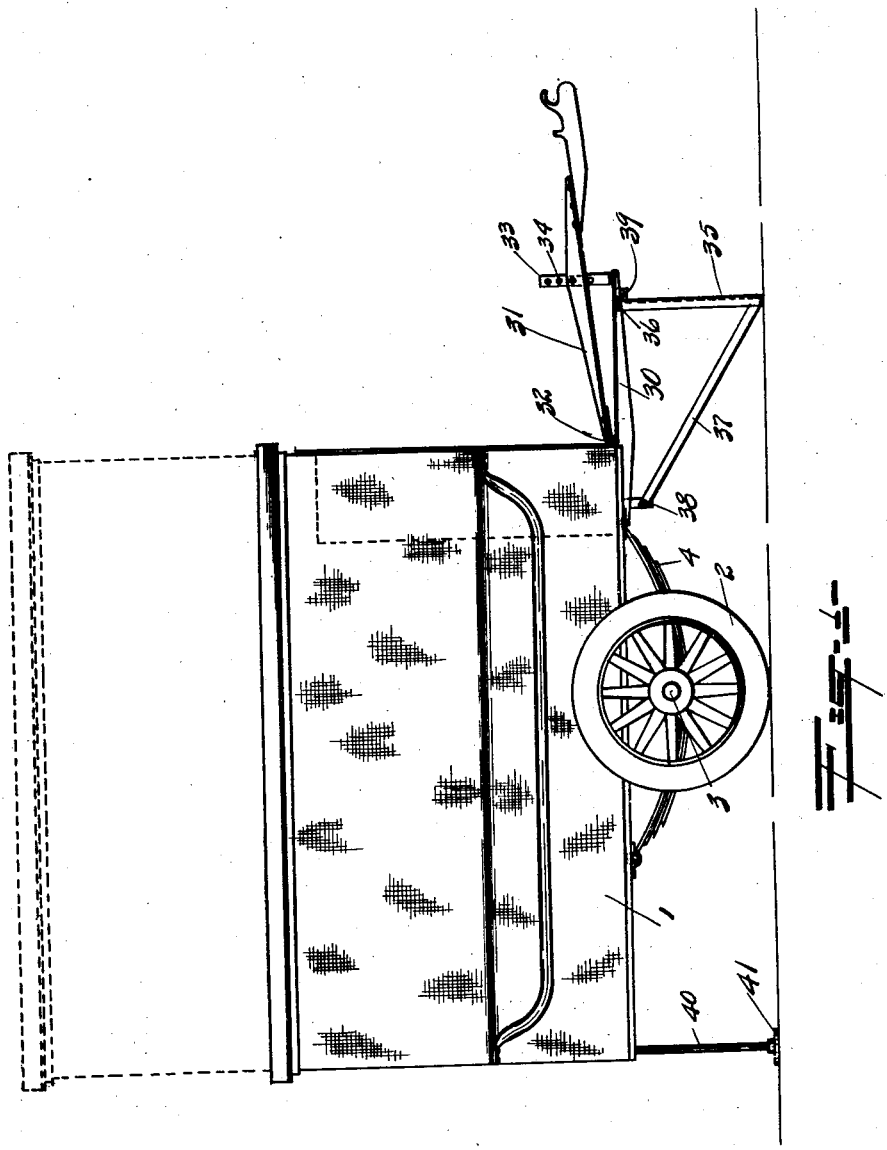
Inventor
Frank Zagelmeyer
By Frank C. Karman
Attorney

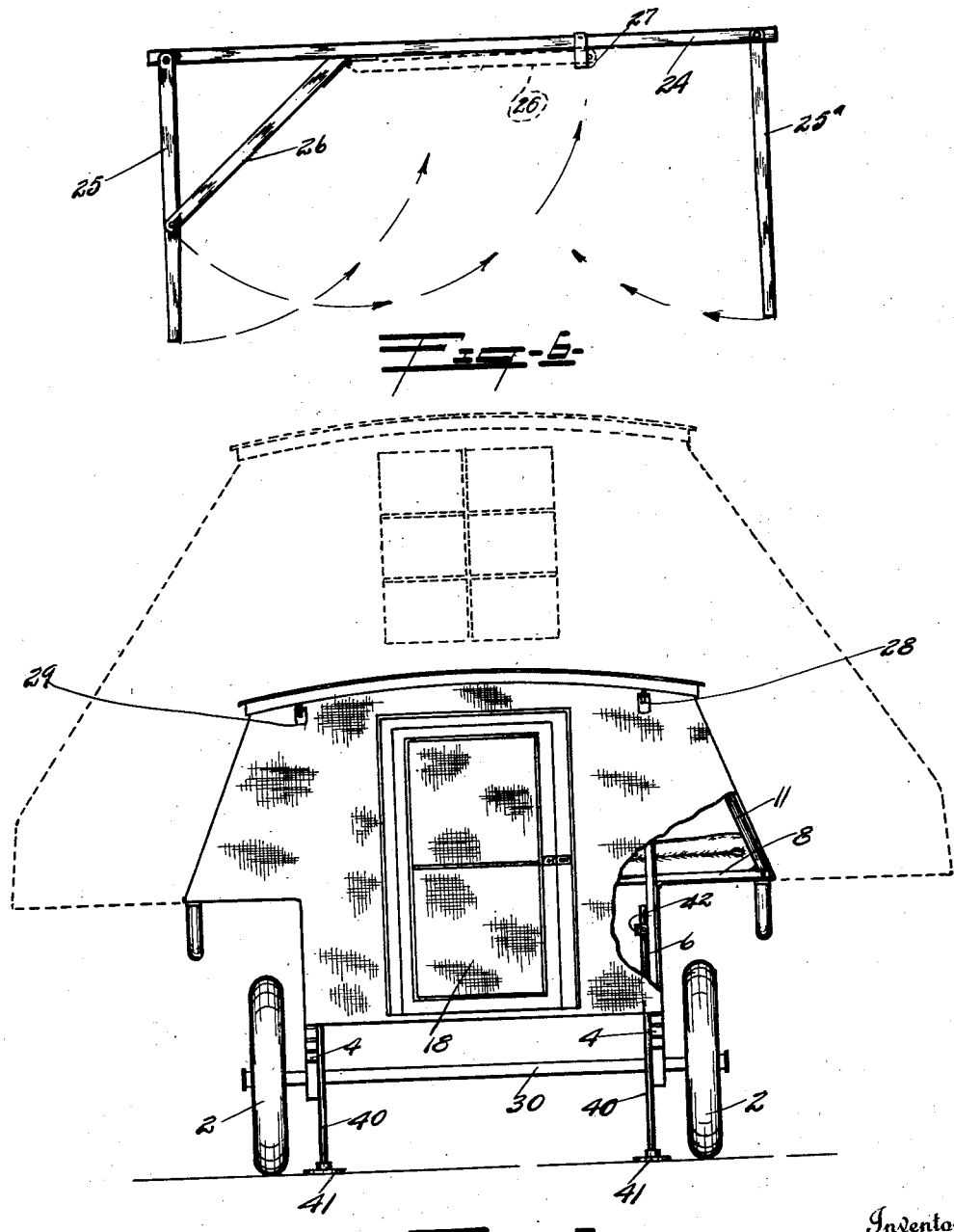

Nov. 22, 1927.
F. ZAGELMEYER
AUTOMOBILE CAMP TRAILER
Filed Oct. 7, 1922
1,650,253
5 Sheets-Sheet 3
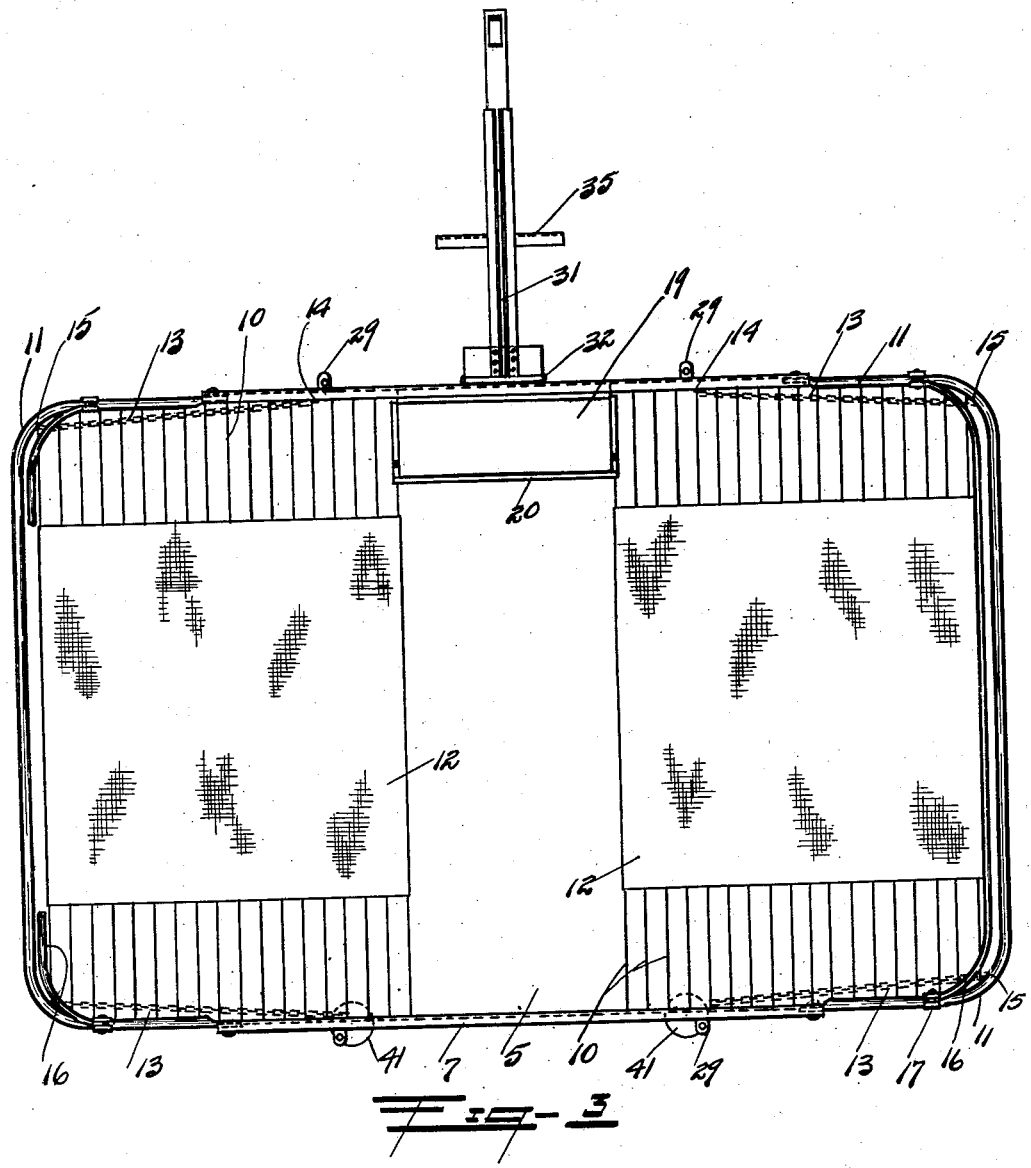
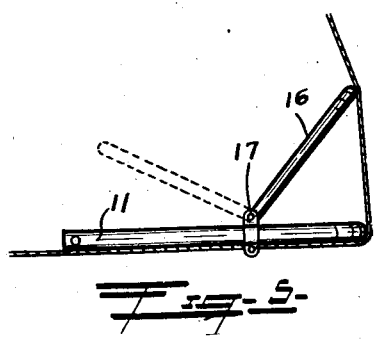
Inventor
Frank Zagelmeyer
By Frank C. Seaman
Attorney Nov. 22, 1927.
1,650,253
F. ZAGELMEYER
AUTOMOBILE CAMP TRAILER
Filed Oct. 7, 1922
5 Sheets-Sheet 4
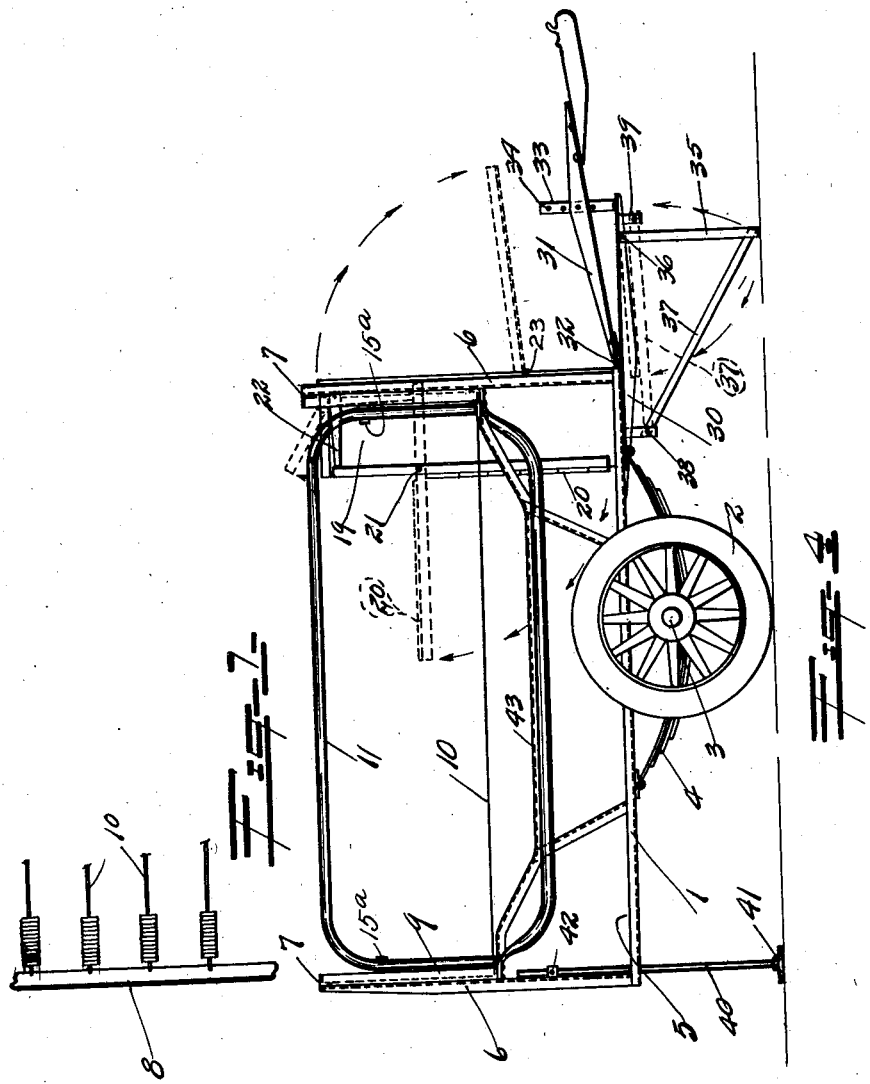
Inventor
*Frank Zagelmeyer.*
By *Frank C. Harman.*
Attorney

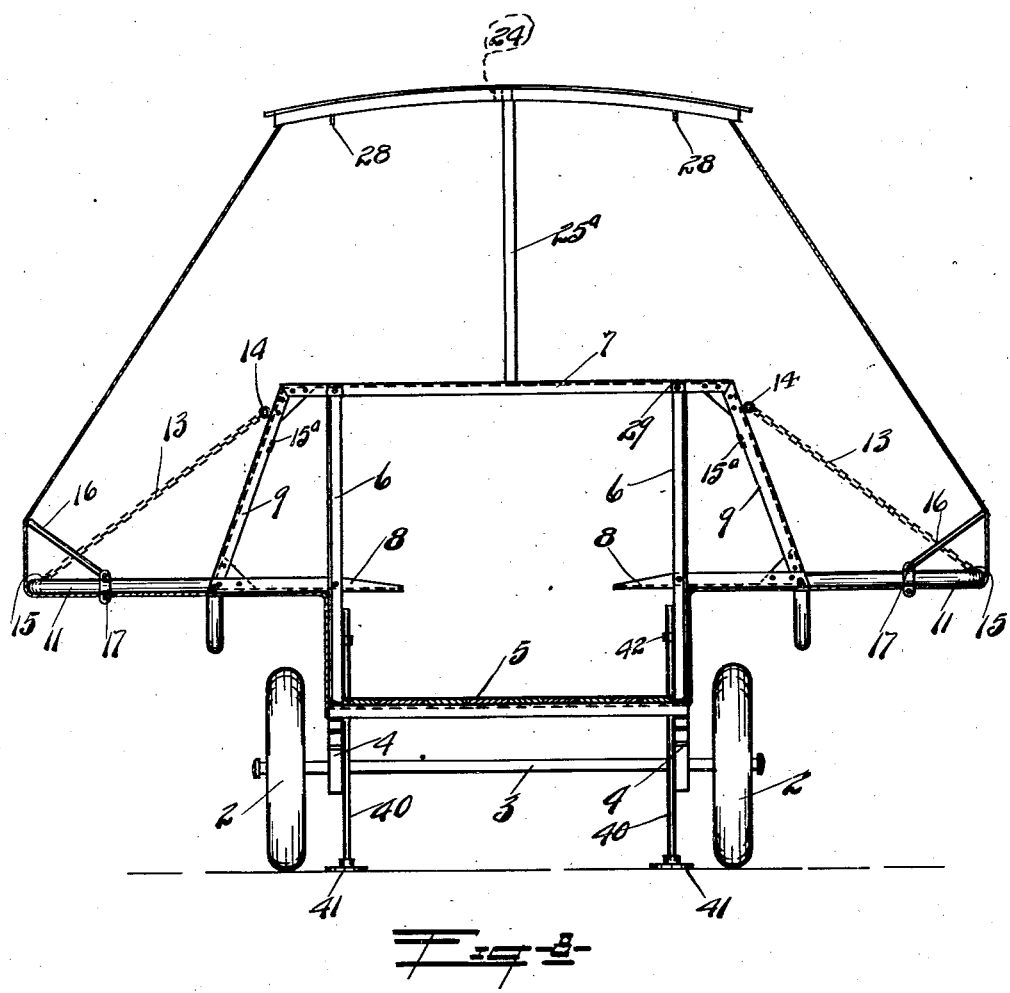

Patented Nov. 22, 1927.

1,650,253

UNITED STATES PATENT OFFICE.

FRANK ZAGELMEYER, OF BAY CITY, MICHIGAN.

AUTOMOBILE CAMP TRAILER.

Application filed October 7, 1922. Serial No. 593,992.

This invention relates to automobile camp trailers and the like.

One object of the invention is to design a light, compact and weather proof structure in the form of an automobile trailer which can be quickly and easily transformed into a complete, comfortable and commodious sleeping and cooking compartment, and which can be very easily and quickly collapsed and returned into conditions for traveling.

Another object resides in the provision of novel adjustable and foldable supporting and draft mechanism for supporting the trailer when in use as a camp, and for connecting the trailer to the vehicle proper.

A further object of the invention is to provide a pair of foldable berths and so arrange the supporting structure so that there will be no longitudinal braces or other structural members between the berth proper and the top.

The above and other objects will appear as the specification progresses, reference being had to the accompanying drawings in which like reference numerals indicate like parts throughout the several views thereof.

In the drawings:—

Fig. 1 is a side view of my improved camp trailer, the full lines illustrating it collapsed and folded for travel, the dotted lines illustrating the top raised and the outfit ready for occupancy.

Fig. 2 is a rear end part sectional view, the full lines illustrating the outfit collapsed and ready for travel, the dotted lines illustrating it raised and ready for occupancy.

Fig. 3 is a top plan view with the canvas and top removed and showing the berths in open position.

Fig. 4 is a side view of the frame, with the side canvas and top removed, and the berths folded, the dotted lines illustrating the table of the kitchenette ready for use also the draft and forward support mechanism folded for travel.

Fig. 5 is an enlarged detail view of the outer section of one of the berths, the dotted lines illustrating the bale folded to retain the mattress and bedding.

Fig. 6 is a view of the foldable top supporting members, the numerous arrows indicating the travel of the stays when swung to folded position.

Fig. 7 is an enlarged fragmentary view illustrating the connection of the berth springs to the end members.

Fig. 8 is an end view of the trailer illustrating the frame construction, the canvas covering being shown in cross section.

Fig. 9 is a fragmentary sectional view of the top illustrating the canvas permanently attached thereto.

Referring now particularly to the drawings in which I have shown the preferred embodiment of my invention, the numeral 1 indicates the body of the trailer which is provided with a pair of ground engaging wheels 2 mounted on the axle 3 in the usual manner, springs 4 support the body proper above the wheels, this body being constructed of small angles, one leg of which is sheared whenever it is possible to do so without weakening the structure, this is done to eliminate weight etc. A floor 5 preferably of wood is laid in the frame 1 and corner angles 6 extend upwardly and are securely riveted to a transversally disposed angle 7 which projects slightly beyond the corner members. Short transversally disposed members 8 are secured to the uprights 6 intermediate the length thereof, and these members 7 and 8 are adapted to be connected by means of short sections 9 secured to the outer ends thereof, gusset plates being used in the corners to provide a rigid and strong connection, spring wires 10 are connected to these members 8 as clearly shown in Fig. 7 of the drawing and form the inner section of the berth. A metal tubing or frame 11 is pivotally connected to the outer ends of the members 8 and this is also strung with wire in a similar manner, and forms the outer foldable section of the berth, a canvas 12 being sewed on these wires to hold them in proper position with relation to each other and distribute the weight of the berth occupants over the entire berth.

A flexible chain or cord 13 is used to support the outer section of the berth when in open position, and is connected to the member 9 at the point 14 and to the berth at the point 15, a stop 15ª serving to limit the upward swing of the berth section and hold it in position. A bale 16 is pivotally connected to this outer berth section 11 at the point 17, and is preferably formed of metal tubing, this serves to hold the mattress and bed clothing in position when the berth is folded and serves to hold the side wall of canvas, so that it extends vertically forming a straight side wall for the berth when the outfit is open for use as clearly shown in Fig. 5 of the drawings.

An entrance door 18 is formed in the rear of the outfit and is hinged to the frame in the usual manner, and a kitchenette 19 is located at the front, and is provided with several compartments for storage of eatables etc., the lower part is formed as an icebox, and a cover is hinged to the top thereof. A table 20 is pivotally connected to the kitchenette at the point 21 and when not in use is held in closed position by means of the pivoted stop 22, and when it is desired to use this table, it is swung to position as shown in dotted lines in Fig. 4, the stop is then swung downwardly and supports the table in this position. The front end is also formed as a table, being hinged at the point 23 and swings downwardly as shown by the dotted lines in Fig. 4, this is for use when it is desired to eat or use the table while outside.

The sides of the outfit are formed of a good grade of canvas and are provided with loosely woven fabric windows in the front and rear, and these windows can be closed by lowering a flap (not shown) which can be connected to a pair of cords which can be manipulated from the inside of the outfit, this canvas folds inwardly with the berths when the outfit is collapsed. The top is formed of light strips of wood, a center member 24 being secured to the top and supports 25 and 25ª are pivotally secured thereto, the front support 25 being braced by means of a hinged stay 26 detachably secured thereto, and when the outfit is collapsed these supports and the stay are swung upwardly as indicated by the arrows in Fig. 6, and are secured in position by means of a flexible strap 27 or the like. The top is slightly larger than the frame and spaced apart pins 28 are secured thereto, clips 29 are in turn secured to the frame, and are provided with openings therein which are adapted to receive the pins and prevent the chafing of the canvas when the outfit is traveling on the road.

The draft mechanism extends beyond the body and comprises a pair of angles 30 placed back to back to form the tongue. A similar pair of angles 31 are hinged to the body at the point 32 and a suitable attaching mechanism is secured to the end thereof. A flat vertically extending member 33 is secured to the tongue, and extends between the angles 31, bolt receiving openings 34 being formed therein in spaced relation so that the member 31 may be adjusted as to height to suit the draft of the vehicle.

For steadying the front of the trailer when used for camping purposes I provide a foot member 35, this is pivotally connected to the tongue 30 at the point 36, a brace 37 being detachably connected to the lower end of this foot, the opposite end being pivotally secured to the strap 38 which is in turn secured to the tongue member 30, and when traveling this foot is swung upwardly against the tongue, the brace is then swung up and secured to the depending strap member 39 as shown in dotted lines in Fig. 4, thereby holding the foot in raised position.

The rear end of the trailer is supported by means of small pipe members 40 fitted with standard flanges 41, a small bracket 42 being secured to the upright 6 and a plurality of openings are formed in the upper end of the pipes, a pin being inserted in the bracket and enters one of the openings in the pipe, these supporting members are slid upwardly when preparing for travel, the flanges resting against the bottom of the floor.

I wish to direct particular attention to the construction of the frame, the berth brace 43 of which is formed as a truss, in fact the frame is very light but the construction is strong and rigid, slots (not shown) can be formed in these braces 43 and suitcases or the like can be strapped thereto and carried on the outside of the canvas. The outfit is weather and insect proof as the canvas is permanently attached to the roof and floor of the trailer and the outfit when collapsed is sufficiently low to allow the vehicle driver a clear rear vision and afford ample head room when raised.

From the foregoing description it will be obvious that I have perfected a very light, compact and complete camping trailer.

What I claim is:—

The combination with a camp trailer having a pair of sectional foldable berths thereon, of a kitchenette mounted thereon, a table pivotally connected to said kitchenette within said trailer, a stop pivoted to the kitchenette, adapted in one position to firmly hold the table raised, and in opposite position to hold it firmly against the kitchenette, and a second table pivoted to the opposite side of said kitchenette and foldable outwardly from the body of the trailer.

In testimony whereof I hereunto affix my signature.

FRANK ZAGELMEYER.